United States Patent [19]

Carsello et al.

[11] Patent Number: 4,463,544

[45] Date of Patent: Aug. 7, 1984

[54] EDGER

[75] Inventors: Anthony Carsello, Chino; James J. Michel, Agoura, both of Calif.

[73] Assignee: Allegretti & Company, Chatsworth, Calif.

[21] Appl. No.: 374,429

[22] Filed: May 3, 1982

[51] Int. Cl.³ ............................................. A01D 53/14
[52] U.S. Cl. ...................................... 56/17.1; 56/17.2; 56/256; 172/13; 172/17
[58] Field of Search ....................... 56/17.1, 17.2, 256; 172/13, 14, 15, 17; 280/43.13, 43.17, 43.21, 43.22, 43.24

[56] References Cited

U.S. PATENT DOCUMENTS

| | | | |
|---|---|---|---|
| 229,375 | 6/1880 | Cahill | 280/43.17 |
| 2,909,021 | 10/1959 | McLane | 56/17.1 |
| 2,938,323 | 5/1960 | Livingston et al. | 56/16.9 |
| 3,090,186 | 5/1963 | Dykes et al. | 56/256 |
| 3,130,793 | 4/1964 | Allegretti | 172/15 |
| 3,221,481 | 12/1965 | Mattson et al. | 56/17.1 |
| 3,330,102 | 7/1967 | Shuman, Jr. | 56/17.1 |
| 3,561,199 | 2/1971 | Lay | 56/17.1 |
| 4,143,453 | 3/1979 | Taluba | 46/163 |

Primary Examiner—Gene Mancene
Assistant Examiner—David I. Tarnoff
Attorney, Agent, or Firm—Fulwider, Patton, Rieber, Lee & Utecht

[57] ABSTRACT

An edger is provided with a rotatable cutting blade for trimming grass, weeds, and the like, wherein the angular orientation of the cutting blade is quickly and easily adjusted to a selected one of several cutting positions. The cutting blade is driven by a motor mounted within a motor housing which is in turn supported for rotation about a longitudinal axis between a front wheel assembly and a rear wheel assembly. A locking mechanism carried by the motor housing has a pair of spring-biased lugs normally received into locking recesses in the front and rear wheel assemblies to lock the motor housing at a selected rotational position and thereby lock the cutting blade at a selected angular orientation. The locking mechanism is manually retractable to withdraw the lugs simultaneously from their respective locking recesses to permit rotation of the motor housing simultaneously with respect to the front and rear wheel assemblies to alter the angular orientation of the cutting blade. In addition, the front wheel assembly includes at least one front wheel carried at the distal end of a pivot arm supported for pivoting movement about a transverse axis to adjust the vertical position of the wheel and thereby adjust the elevation of the cutting blade. A spring-loaded locking disk normally engages one side of the pivot arm to prevent wheel elevation adjustment and is retractable manually to permit wheel elevation adjustment.

34 Claims, 13 Drawing Figures

U.S. Patent   Aug. 7, 1984   Sheet 1 of 3   4,463,544
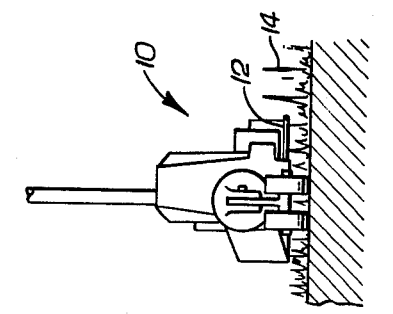
Fig. 2a EDGE
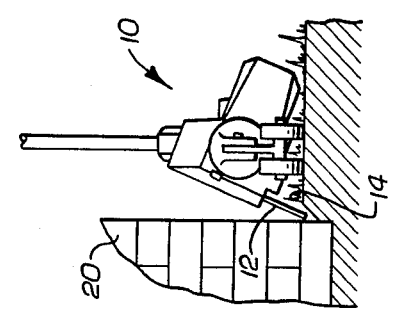
Fig. 2b TRENCH
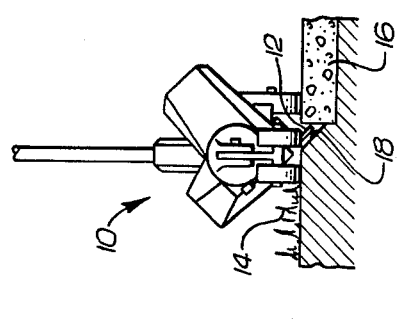
Fig. 2c BEVEL
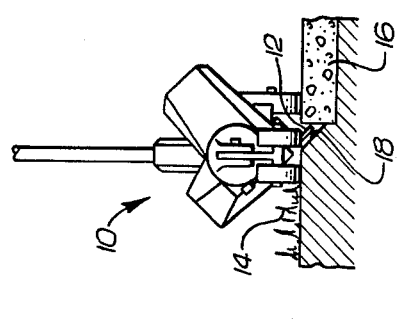
Fig. 2d LEVEL CUT
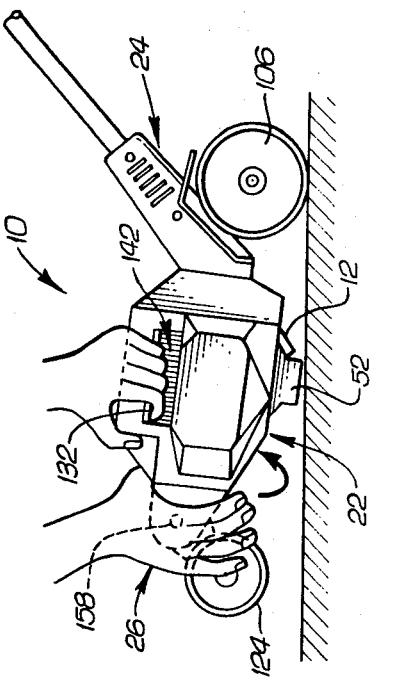
Fig. 3
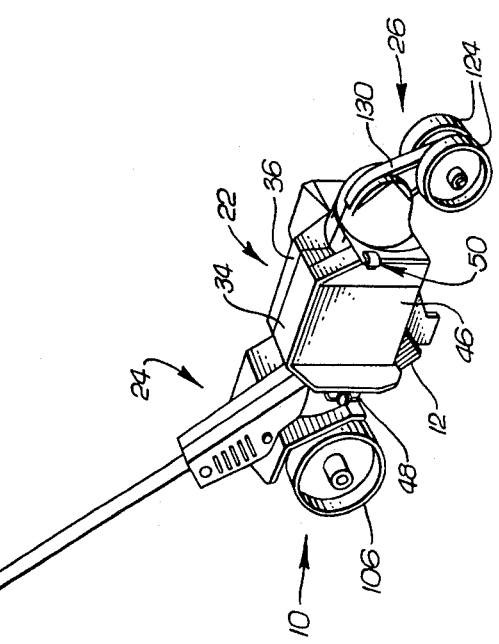
Fig. 1

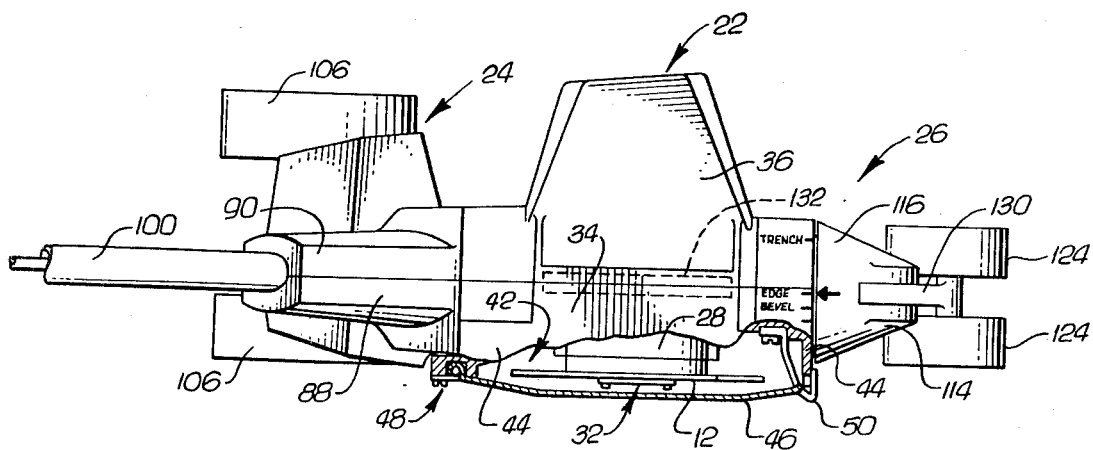

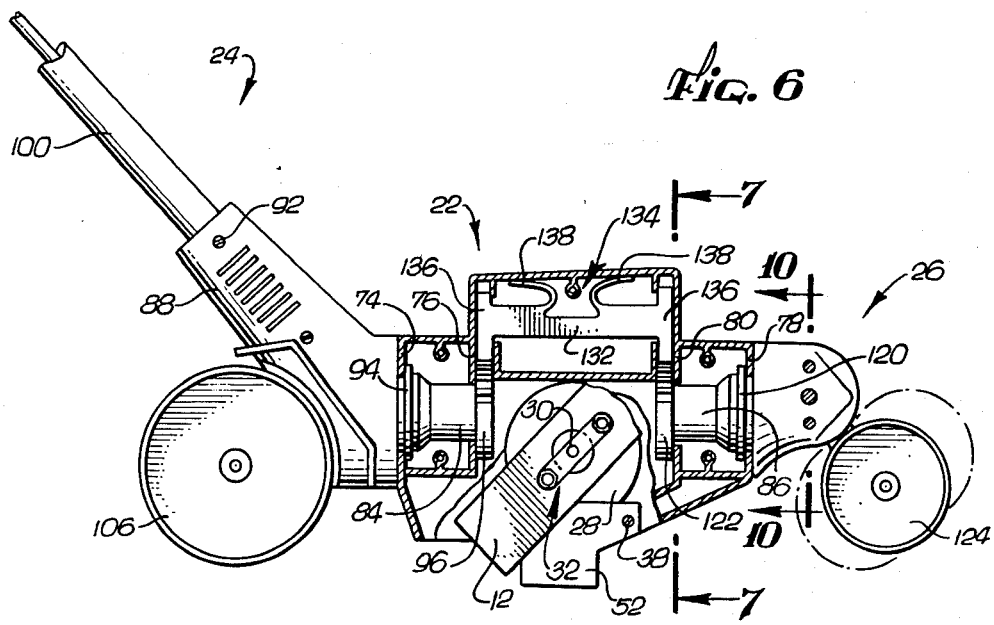
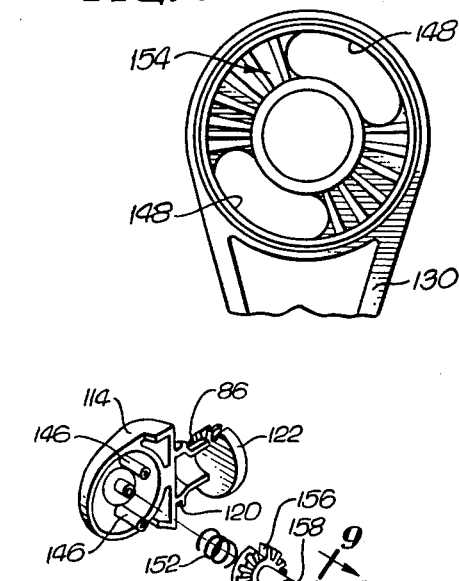
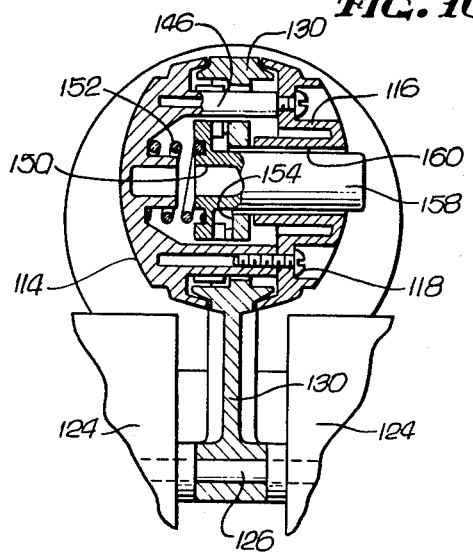

EDGER

BACKGROUND OF THE INVENTION

This invention relates generally to an improved edger designed primarily for lawn and garden use for trimming grass, weeds, and the like growing along the edge of a paved surface, such as a sidewalk or driveway, or along the edge of a building. More specifically, this invention relates to an edger having a motor-driven cutting blade wherein the cutting blade is quickly and easily adjusted to one of a plurality of selected angular orientations.

Edgers in general are well known for use in a lawn and garden environment wherein the edger includes a power-driven cutting blade for trimming grass or weeds growing along the edge of a paved surface, such as a sidewalk, driveway, or the like. The cutting blade is driven typically by an electric or gasoline motor supported by a relatively lightweight frame which is in turn supported by one or more wheels at the rear of the frame and, if additional stability is desired, by one or more wheels at the front of the frame. A tubular handlebar projects upwardly from the rear of the frame and terminates in a suitable hand grip to facilitate pushing of the edger during use. In a typical trimming operation, the cutting blade is oriented for rotation in a vertical plane generally at the side of the frame such that the edger can be pushed along the edge of the paved surface with the cutting blade disposed to trim grass or weeds growing adjacent the outside edge of the paved surface.

For some trimming operations, however, it is desirable to orient the cutting blade at an alternative position, such as, for example, rotation in a horizontal plane for trimming grass or weeds at a specified height or rotation at an oblique angle for making an angular cut along the edge of a paved surface. In this regard, edgers are known in the art wherein the motor and cutting blade are supported by a portion of the frame which is movable with respect to the rear wheels to permit adjustment of the cutting blade to the selected alternative position, and a locking mechanism, such as a spring-loaded locking pin, is provided for releasably locking the movable frame portion in the selected position of adjustment. Moreover, in edgers including one or more front wheels for added stability, it is also desirable to adjust the front wheels with respect to the movable frame portion so that the front wheels are operational regardless of the position of blade adjustment. In the art, however, front wheel adjustment is accomplished separately from the rear wheels whereby adjustment of the cutting blade to an alternative cutting position is a multiple-step process. In addition, front wheel adjustment requires inclusion of an additional locking mechanism for releasably locking the front wheels in position to thus increase the overall cost and complexity of the edger. As a result, in an effort to reduce edger cost and complexity, many edgers have been provided which fix the front wheels against adjustment thereby compromising edger stability when the cutting blade is rotated to a position displaced from the vertical plane.

There exists, therefore, a need for an improved edger of the type having front and rear wheels wherein the cutting blade can be adjusted quickly and easily with respect to the front and rear wheels to any one of a plurality of alternative cutting positions, and wherein this adjustment can be performed simultaneously with respect to the front and rear wheels by use of a single adjustment step. The present invention fulfills this need.

SUMMARY OF THE INVENTION

In accordance with the invention, an improved edger is provided including a rotatable cutting blade for trimming grass or weeds primarily of the type growing along the edge of a paved surface, such as a sidewalk or driveway. The cutting blade is driven by a motor carried within a motor housing supported between front and rear wheel assemblies which respectively include one or more wheels to permit stable rolling movement of the edger, and a handlebar projects upwardly from the rear wheel assembly and terminates in a suitable hand grip to facilitate pushing the edger during use. The motor housing is rotatable with respect to both wheel assemblies about a longitudinal axis to permit selected adjustment of the angular orientation of the cutting blade as desired to an alternative cutting position. A locking mechanism on the motor housing has a pair of spring-loaded lugs receivable into aligned locking recesses formed respectively in the front and rear wheel assemblies to lock the motor housing in position and thereby lock the cutting blade in a selected cutting position. The lugs are retractable simultaneously from the recesses to permit rotation of the motor housing simultaneously with respect to both wheel assemblies to an alternative rotational position to orient the cutting blade in an alternative cutting position.

In one preferred form of the invention, the motor housing comprises a pair of housing halves which when connected define a pair of cylindrical openings generally coincident about the longitudinal axis for respective reception of a mounting tube projecting forwardly from the rear wheel assembly and a mounting tube projecting rearwardly from the front wheel assembly. Each one of these mounting tubes includes at its distal end a radially enlarged thrust collar of sufficient diameter to prevent removal of the front and rear wheel assemblies from the motor housing while permitting rotational movement of the motor housing with respect thereto. At least a portion of the arcuate periphery of each thrust collar is interrupted by a plurality of radially outwardly presenting locking recesses for reception of the associated locking mechanism lug to prevent motor housing rotation with respect to the wheel assemblies.

The locking mechanism comprises an elongated actuator bar carried within a longitudinally extending chamber in the motor housing for generally parallel movement toward and away from the longitudinal axis. The actuator bar is joined at its opposite ends to the pair of lugs which project therefrom respectively toward the thrust collars of the front and rear wheel assemblies for reception into the associated locking recesses. Spring arms react between the motor housing and the actuator bar to urge the bar in a direction moving the lugs into locking engagement with the thrust collars to prevent motor housing rotation with respect to the wheel assemblies. However, a portion of the actuator bar is exposed through a laterally open slot in the motor housing to permit manual grasping of the actuator bar and retraction thereof against the spring arms to withdraw the lugs substantially simultaneously from their associated locking recesses and thereupon permit rotation of the motor housing substantially simultaneously with respect to the front and rear wheel assemblies. Upon release of the actuator bar, the spring arms return the bar to a position with the lugs lockingly received into the associated locking recesses in the thrust collars to lock the motor housing against rotation.

According to a further aspect of the invention, the front wheel assembly comprises a pair of sections defining a generally forwardly open vertical slot for receiving the upper end of a pivot arm which projects generally downwardly and forwardly therefrom and supports at least one front wheel at its lower end. The pivot arm is constrained within the slot for pivoting movement about a transverse axis to adjust the vertical position of the front wheels and thereby also adjust the vertical position of the cutting blade carried by the motor housing. A locking disk having a serrated locking surface is urged by a spring into normal locking engagement with a complementary-shaped axial face on the pivot arm to lock the pivot arm against rotation about the transverse axis and thereby lock the front wheels in a selected position of vertical adjustment. A portion of the locking disk is exposed through an opening in one of the wheel assembly sections to permit manual retraction of the disk from the pivot arm and thereby permit rotation of the pivot arm to adjust the vertical position of the front wheels.

Other features and advantages of the present invention will become more apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 1 is a perspective view of an edger embodying the novel features of this invention;

FIGS. 2a through 2d are front elevation views of the edger adjusted to alternative operating or cutting positions;

FIG. 3 is a fragmented side elevation view of the edger illustrating adjustment thereof to alternative operating positions;

FIG. 4 is a fragmented top plan view of the edger with portions broken away to illustrate construction details thereof;

FIG. 5 is an exploded perspective view illustrating assembly of the edger;

FIG. 6 is an enlarged side elevation view, partially in vertical section, illustrating further construction details of the edger;

FIG. 7 is an enlarged fragmented vertical section taken generally on the line 7—7 of FIG. 6;

FIG. 8 is an exploded perspective view illustrating assembly of a portion of the edger;

FIG. 9 is an enlarged fragmented vertical section taken generally on the line 9—9 of FIG. 8; and FIG. 10 is an enlarged fragmented vertical section taken generally on the line 10—10 of FIG. 6.

DETAILED DESCRIPTION OF THE PREFERRED EMBODIMENT

As shown in the exemplary drawings, an edger designated generally by the reference numeral 10 is provided particularly for use in a lawn and garden environment to trim grass, weeds and the like. The edger 10 comprises a relatively lightweight implement having a power-driven cutting blade 12 which can be adjusted quickly and easily to a selected one of several cutting positions, as required by the particular trimming task.

More specifically, in accordance with one preferred form of the invention, the edger 10 is quickly and easily adjusted to orient the cutting blade 12 at any one of a plurality of different angular orientations, as illustrated in FIGS. 2a through 2d. As shown in FIG. 2a, the edger can be adjusted to a conventional operating or cutting position commonly referred to as the "edge" position, with the cutting blade 12 disposed for rotation within a vertical plane generally at one side of the edger to trim grass or weeds 14 growing adjacent the outside edge of a paved surface 16, such as a sidewalk or driveway. Alternatively, the edger 10 can be adjusted to a "trench" position with the cutting blade 12 oriented at an oblique angle projecting beneath the edger for cutting a shallow, generally V-shaped trench 18 along the edge of a paved surface 16, as viewed in FIG. 2b. Further, the edger can be adjusted to a "bevel" position, as shown in FIG. 2c with the cutting blade 12 oriented at an oblique angle projecting slightly away from the side of the edger. In this "bevel" position, the cutting blade is disposed for trimming grass or weeds 14 up to the edge of a building 20 or the like. Still further, as depicted in FIG. 2d, the edger 10 can be adjusted to orient the blade 12 in a "level cut" position for rotation within a horizontal plane to trim grass or weeds 14 at a specified vertical height. Importantly, adjustment of the edger 10 from one cutting position to another is accomplished quickly and easily as a single-step procedure.

With reference to the illustrative drawings, the edger 10 of this invention comprises a relatively lightweight motor housing 22 supported for rotation between a rear wheel assembly 24 and a front wheel assembly 26. The motor housing 22 encases a suitable drive motor 28, such as an electric motor as illustrated in FIG. 5, which is conveniently supplied with electrical power via a power cord 29 threaded through the rear wheel assembly 24, as will be described in more detail. Alternatively, other types of drive motors can be used, such as, for example, a small gasoline engine or the like. In any event, the drive motor 28 includes a drive shaft 30 (FIG. 6) adapted for suitable connection to a blade assembly 32 including the cutting blade 12 whereby the drive motor rotatably drives the cutting blade at a relatively high rotational speed.

In a preferred form, the motor housing 22 is constructed from a pair of housing halves 34 and 36 which can be formed conveniently from a lightweight and impact-resistant molded plastic or the like. These housing halves 34 and 36, as shown best in FIG. 5, have generally complementary configurations adapted to be fastened together by a plurality of screws 38 which are received through appropriate holes 40 in the housing half 34 and fastened into aligned holes (not shown) in the housing half 36, all in a well-known manner.

The housing halves 34 and 36 of the motor housing 22 cooperate to encase the drive motor 28. In this regard, the drive motor 28 is normally secured in a suitable manner, such as by use of mounting screws (not shown), to the housing half 34, and the housing half 36 is enlarged in a transverse direction to receive and support the drive motor therein. The drive motor 28 projects partially through the housing half 34 for connection at the outboard side of the housing half 34 to the cutting blade 12. Accordingly, as shown best in FIG. 4, the cutting blade 12 is supported for rotation within a longitudinally extending plane generally at one side of the motor housing 22.

The cutting blade 12 is conveniently disposed within a shallow, downwardly open chamber 42 (FIG. 4) to safeguard the operator from accidental contact with the blade or objects thrown by the blade while permitting the blade to project downwardly a short distance from the chamber 42 for trimming engagement with grass or weeds. This chamber 42 is bounded at the front, top, and rear by a flange 44 projecting laterally from the housing half 34 and at the side by a protective cover plate 46 secured to the flange 44. Conveniently, the cover plate 46 is pivotally secured to the rear portion of the flange 44 by a hinge assembly 48 of any suitable construction and is releasably secured to the front portion of the flange 44 by a releasable spring latch 50 or the like whereby the cover plate 46 can be pivoted away from the cutting blade 12 to expose the chamber 42 for permitting periodic removal of grass remnants and debris from the chamber. For added safety, a guide plate 52 as, shown best in FIG. 6, is fastened to the housing half 34 by the screws 38 and projects from the motor housing 22 generally in close parallel relation with the cutting blade 12 to help guide the edger during use and to minimize blade contact with hard objects, such as rocks or paved surfaces, which could otherwise damage the blade.

In accordance with a primary aspect of the invention, the two housing halves 34 and 36 of the motor housing 22 cooperate when connected to define a pair of generally cylindrical openings 70 and 72 which facilitate rotatable connection of the motor housing to the rear and front wheel assemblies 24 and 26. More specifically, as illustrated in FIGS. 5 and 6, the cylindrical opening 70 is defined by axially spaced pairs of complementary semicircular shoulders 74 and 76 molded as integral portions of the housing halves 34 and 36 to provide two axially spaced circular openings at the rear of the motor housing. Similarly, the cylindrical opening 72 is defined by axially spaced pairs of complementary semicircular shoulders 78 and 80 molded into the housing halves to provide two axially spaced circular openings at the front of the motor housing. Importantly, the two cylindrical openings 70 and 72 are formed generally about a common longitudinal axis designated in FIG. 5 by the reference numeral 82.

The rear and front wheel assemblies 24 and 26 respectively include generally cylindrical mounting tubes 84 and 86 sized for reception into the cylindrical openings 70 and 72 of the motor housing 22 when the housing halves 34 and 36 are fastened to each other. These mounting tubes 84 and 86 are sized to permit relatively wobble-free rotation of the motor housing 22 with respect to both wheel assemblies 24 and 26 about the longitudinal axis 82 to alter the angular orientation of the cutting blade 12 and thereby modify the cutting position of the blade.

A preferred form of the rear wheel assembly 24 is shown in detail in FIGS. 4–6. As illustrated, the rear wheel assembly 24 is defined by a pair of complementary-shaped sections 88 and 90 which can be formed conveniently from a lightweight and impact-resistant plastic for connection to each other by a plurality of screws 92. The two sections 88 and 90 include semicylindrical projections which cooperate with one another to define the forwardly presented mounting tube 84 sized for reception into the cylindrical opening 70 at the rear of the motor housing. This mounting tube 84 includes a radially enlarged thrust shoulder 94 and a radially enlarged thrust collar 96 positioned for respectively engaging the axially forward surfaces of the motor housing shoulders 74 and 76 to prevent substantially any axial displacement of the rear wheel assembly 24 with respect to the motor housing. The thrust shoulder 94 and the thrust collar 96 do not, however, interfere with rotational movement of the motor housing 22 about the longitudinal axis 82 and with respect to the rear wheel assembly 24.

The mounting tube 84 of the rear wheel assembly 24 defines an open passageway 98 through which the power cord 29 connected to the drive motor 28 can be threaded. As shown in FIG. 5, this power cord 29 is threaded further through a tubular handlebar 100 which is connected to the rear wheel assembly by a pair of the screws 92 and projects rearwardly and upwardly therefrom. As viewed in FIG. 1, a hand grip 102 is mounted at the upper end of the handlebar 100 and conveniently supports a switch 104, such as a conventional trigger switch, for controlling supply of electrical power to the drive motor whenever the power cord 29 is coupled to a suitable electrical power supply (not shown).

The rear wheel assembly 24 further includes a pair of rear wheels 106 supported for rotation about a transverse axis. More specifically, the two sections 88 and 90 define a transverse bore 108 for receiving a rod-shaped axle 110. The axle 110 has a length to project outwardly from the bore 108 for reception of its opposite ends through the rear wheels 106. Push nuts 112 or the like are pressed over the opposite ends of the axle to retain the rear wheels in place, whereby the edger 10 can be rolled over the ground in a conventional manner by pushing on the handlebar 100.

The front wheel assembly 26 also comprises, in a preferred form, a pair of complementary-shaped sections 114 and 116 cooperating with one another to define the associated mounting tube 86. More particularly, the two sections 114 and 116 can be advantageously constructed from an impact-resistant molded plastic and fastened together by a plurality of screws 118 to define the rearwardly presented mounting tube 86, as viewed in FIGS. 5, 6, and 9, sized for rotatable reception into the cylindrical opening 72 at the front of the motor housing. Importantly, the mounting tube 86 includes a radially enlarged thrust shoulder 120 and a radially enlarged thrust collar 122 spaced axially from each other for respectively engaging the axially rear surfaces of the motor housing shoulders 78 and 80 to prevent substantially any axial displacement of the front wheel assembly 26 with respect to the motor housing 22.

The front wheel assembly 26 further includes a pair of front wheels 124 supported for rotation about a transverse axis whereby the front wheels 124 cooperate with the rear wheels 106 to provide the edger 10 with a high degree of longitudinal stability. These front wheels 124 are rotatably carried at the opposite ends of a rod-shaped front axle 126 received transversely through a bore 128 at the lower end of a pivot arm 130, with a pair of push nuts 132 or the like being pressed onto the opposite ends of the axle 126 to retain the front wheels 124 in place. The pivot arm 130 is in turn carried between the two sections 114 and 116 of the front wheel assembly 26 in a position supporting the front wheels 124 for rolling engagement with the ground.

Accordingly, the rear and front wheel assemblies 24 and 26 support the motor housing 22 for stable rolling movement over the ground while at the same time permitting rotation of the motor housing about the longitudinal axis 82 with respect to both wheel assemblies.

Such rotation of the motor housing is accompanied by a corresponding alteration in the angular orientation of the cutting blade 12. Thus, by rotating the motor housing 22 with respect to the wheel assemblies, the cutting blade 12 can be moved as desired to any one of a variety of different cutting positions, with the cutting positions depicted in FIGS. 2a through 2d being illustrative of the different positions which might be desired in a typical lawn and garden environment.

The edger 10 includes a locking mechanism for releasably locking the motor housing 22 in the selected rotational position to correspondingly lock the cutting blade 12 in the chosen cutting position. This locking mechanism comprises, as illustrated in FIGS. 5-7, a longitudinally elongated actuator bar 132 supported within a longitudinally elongated chamber 134 defined between the connected pair of motor housing halves 34 and 36. The acutator bar 132 is joined at its opposite ends to a pair of lugs 136 which project radially inwardly from the bar 132 toward the longitudinal axis 82 about which the motor housing rotates. Importantly, these lugs 136 are axially aligned respectively with the two thrust collars 96 and 122 of the two wheel assemblies and are biased into normal engagement with the peripheries of the thrust collars by a pair of spring arms 138 reacting between the motor housing and the actuator bar 132. Conveniently, as illustrated, the actuator bar can be formed integrally with the lugs 136 and the spring arm 138 from a suitable lightweight material, such as a molded plastic or the like.

The thrust collars 96 and 122 each include a plurality of radially outwardly presented locking recesses 140 formed about the periphery thereof for locking reception of the associated lugs 136. As illustrated, these recesses 140 extend arcuately over a significant portion of the collar peripheries to an extent correlated with the degree of rotational motor housing movement required to accommodate all of the desired blade cutting positions. The lugs 136 are normally received into an associated pair of the recesses 140 to lock the motor housing into position with the cutting blade at a selected cutting position.

The lugs 136 of the locking mechanism are retractable manually from the thrust collars 96 and 122 to permit adjustment of the motor housing and cutting blade to an alternative position. More particularly, a radially inner portion of the actuator bar 132 is exposed through a laterally open slot 142 in the housing half 36 (FIGS. 3 and 5) to permit manual grasping of the bar and movement thereof within the chamber 134 in a direction radially away from the longitudinal axis 82 and against the force of the spring arms 138. This movement serves to retract the lugs 136 substantially simultaneously from the locking recesses 140 to permit rotational adjustment of the motor housing. Importantly, this simultaneous retraction of the lugs 136 permits this adjustment to occur simultaneously with respect to both wheel assemblies 24 and 26 such that the cutting blade 12 can be moved to an alternative cutting position with a single adjustment step. As shown in FIG. 3, this adjustment is most easily achieved by lifting the front wheel assembly 26 off the ground and holding the front wheel assembly with one hand while retracting the actuator bar 132 and rotating the motor housing 22 with the other hand. When the new rotational position is reached, the actuator bar 132 is released to allow the spring arms 138 to return the lugs 136 into locking engagement with a newly aligned pair of locking recesses 140 on the thrust collars 96 and 122.

The edger of this invention thus provides a simplified housing construction which permits rapid and easy adjustment of the cutting position of the cutting blade 12 in a simple, single-step maneuver. This adjustment is achieved simultaneously with respect to both front and rear wheel assemblies by operation of a single locking mechanism, while maintaining both wheel assemblies in an orientation for proper rolling engagement with the ground at all times. As a result, the wheel assemblies provide maximum stability to the edger regardless of the cutting position of the blade 12.

According to an additional aspect of the invention, the pivot arm 130 of the front wheel assembly 26 is supported for releasable rotation about a transverse axis with respect to the two connected sections 114 and 116 to permit adjustment of the vertical position of the front wheels 124. More specifically, as shown in FIGS. 5, 6, and 8-10, the upper end of the pivot arm 130 has an enlarged generally circular shape for reception into a forwardly open vertical slot 144 defined by the two connected sections 114 and 116. This upper end of the pivot arm 130 is captured for rotation about a transverse axis within a prescribed arcuate limit by a pair of studs 146 on the section 114 received through arcuate lobes 148 in the pivot arm 130, wherein the studs are adapted to receive the screws 118 when the two sections 114 and 116 are fastened together.

The pivot arm 130 is normally locked against pivoting movement by a locking disk 150 interposed between the arm 130 and the adjacent section 114 and urged by a compression spring 152 into bearing engagement with the adjacent axial face 154 of the pivot arm. This locking disk 150 includes a serrated locking surface for engagement with a complementary-shaped serrated geometry on the pivot arm face 154 to prevent relative rotation between the locking disk and the pivot arm. Importantly, the locking disk is fixed against rotation with respect to the wheel assembly section 114 by virtue of two radially open notches 156 in the disk which receive the studs 146, as shown best in FIG. 8.

The locking disk 150 is manually retractable away from engagement with a pivot arm 130 to permit pivoting movement of the arm to adjust the vertical position of the front wheels 124. The manual retraction is achieved, in the illustrated embodiment, by depression of a transversely extending button or stem 158 formed integrally with the locking disk to project through the pivot arm and into an access opening 160 in the other section 116 of the front wheel assembly. The button 158 is thus exposed for manual depression against the force of the spring 152 to push the locking disk 150 away from the pivot arm. This permits pivoting motion of the pivot arm to adjust the vertical elevation of the front wheels 124, as depicted by the dotted lines in FIG. 6, to result in a corresponding adjustment of the vertical elevation of the motor housing 22 and the cutting blade 12.

A variety of modifications and improvements to the invention described herein are believed to be apparent to one skilled in the art. Accordingly, no limitation on the invention is intended, except by way of the appended claims.

What is claimed is:
1. An edger, comprising:
a rear wheel assembly;
a front wheel assembly, a housing supported between said rear and front wheel assemblies for rotation about a generally longitudinal common axis with respect to said wheel assemblies, said housing carrying a cutting blade for relatively high speed rotation within a generally longitudinal plane, said cutting blade being movable to a selected one of a plurality of cutting positions in accordance with the rotational position of said housing with respect to said wheel assemblies; and locking means for releasably locking said housing against rotation with respect to said wheel assemblies, said locking means including a single actuator member movable between first and second positions, and means operated by said actuator member for locking said housing against rotation relative to said wheel assemblies when said actuator member is in said first position and for simultaneously releasing said housing for rotational movement thereof to an alternative rotational position simultaneously with respect to both of said wheel assemblies upon movement of said actuator member to said second position.

2. An edger as set forth in claim 1, including a motor supported by said housing, said motor including a drive shaft coupled to said cutting blade for rotatably driving said blade.

3. An edger as set forth in claim 1 wherein said rear wheel assembly includes a pair of transversely spaced rear wheels.

4. An edger as set forth in claim 1 wherein said front wheel assembly includes a pair of transversely spaced front wheels.

5. An edger as set forth in claim 1 wherein each of said rear and front wheel assemblies has a plurality of locking recesses formed therein, said means operated by said actuator member including a pair of spring-biased lugs carried by said housing for normal locking reception into respectively associated ones of said locking recesses in said rear and front wheel assemblies, said actuator member comprising means for retracting said lugs substantially simultaneously from said associated locking recesses to permit rotational movement of said housing with respect to both of said wheel assemblies.

6. An edger as set forth in claim 5 wherein said actuator member comprises an actuator bar coupled to said lugs and carried for movement toward and away from said common axis within a chamber formed in said housing, said locking means further including spring means for reacting between said housing and said actuator bar for urging said bar toward a normal position with said lugs lockingly received into said associated ones of said locking recesses.

7. An edger as set forth in claim 6 wherein said actuator bar is formed integrally with said lugs and said spring means.

8. An edger as set forth in claim 6 wherein said housing has a slot formed therein partially exposing said actuator bar to permit manual grasping of said bar and movement thereof in a direction generally away from said common axis to retract said lugs from said associated locking recesses.

9. An edger as set froth in claim 5 wherein said housing has a pair of generally cylindrical openings formed therein generally about said common axis, and wherein said rear and front wheel assemblies each include a generally cylindrical mounting tube sized for relatively close reception into a respective one of said openings to permit rotation of said housing with respect to said wheel assemblies, each of said mounting tubes including a radially enlarged thrust collar engageable with a portion of said housing to prevent substantial axial movement of said wheel assemblies with respect to said housing.

10. An edger as set forth in claim 9 wherein said plurality of locking recesses on each of said wheel assemblies are formed about at least a portion of the arcuate peripheries of said thrust collars.

11. An edger as set forth in claim 1 wherein said rear wheel assembly includes at least one rear wheel and wherein said front wheel assembly includes at least one front wheel, and including adjustment means for adjusting the vertical elevation of the associated wheel of one of said rear and front wheel assemblies.

12. An edger as set forth in claim 11 wherein said adjustment means comprises a pivot arm having an upper end mounted on said one of said wheel assemblies for pivoting movement generally about a transverse axis and having the associated wheel carried at the lower end thereof, and a spring-biased locking member interposed between the upper end of said pivot arm and said one of said wheel assemblies for normal engagement with one axial face of said pivot arm to prevent pivoting movement thereof, said locking member being at least partially exposed through an access opening in said one of said wheel assemblies to permit manual retraction of said locking member from said pivot arm and thereby permit pivoting movement of said pivot arm about said transverse axis.

13. An edger as set forth in claim 12 wherein said locking member and said upper end of said pivot arm have generally complementary-shaped interengageable serrated locking surfaces.

14. An edger, comprising:
a rear wheel assembly;
a front wheel assembly;
a housing supported between said rear and front wheel assemblies for substantially simultaneous rotation about a generally longitudinal axis with respect thereto;
a cutting blade carried by said housing for relatively high speed rotation within a generally longitudinal plane; and
locking means including a single integral actuator member engageable with both of said wheel assemblies and carried by said housing for movement between a first position preventing rotational movement of said housing with respect to said wheel assemblies and a second position permitting rotational movement of said housing with respect to said wheel assemblies whereby said single integral actuator member substantially simultaneously releases both of said wheel assemblies upon movement of said actuator member to said second position.

15. An edger as set forth in claim 14 wherein each of said rear and front wheel assemblies has a plurality of locking recesses formed therein, said actuator member including a pair of spring-biased lugs carried by said housing for normal locking reception into respectively associated ones of said locking recesses in said rear and front wheel assemblies, said actuator member retracting said lugs substantially simultaneously from said associated locking recesses upon movement to said second position to permit rotational movement of said housing with respect to both of said wheel assemblies.

16. An edger as set forth in claim 15 wherein said actuator member further comprises an actuator bar coupled to said lugs and carried for movement toward and away from said common axis within a chamber formed in said housing, said locking means further including spring means for reacting between said housing and said actuator bar for urging said bar toward a normal position with said lugs lockingly received into said associated ones of said locking recesses.

17. An edger as set forth in claim 16 wherein said actuator bar is formed integrally with said lugs and said spring means.

18. An edger as set forth in claim 16 wherein said housing has a slot formed therein partially exposing said actuator bar to permit manual grasping of said bar and movement thereof in a direction generally away from said common axis to retract said lugs from said associated locking recesses.

19. An edger as set forth in claim 15 wherein said housing has a pair of generally cylindrical openings formed therein generally about said common axis, and wherein said rear and front wheel assemblies each include a generally cylindrical mounting tube sized for relatively close reception into a respective one of said openings to permit rotation of said housing with respect to said wheel assemblies, each of said mounting tubes including a radially enlarged thrust collar engageable with a portion of said housing to prevent substantial axial movement of said wheel assemblies with respect to said housing.

20. An edger as set forth in claim 19 wherein said plurality of locking recesses on each of said wheel assemblies are formed about at least a portion of the arcuate peripheries of said thrust collars.

21. An edger as set forth in claim 14 wherein said rear wheel assembly includes at least one rear wheel and wherein said front wheel assembly includes at least one front wheel, and including adjustment means for adjusting the vertical elevation of the associated wheel of one of said rear and front wheel assemblies.

22. An edger, comprising:
a rear wheel assembly including a forwardly presented, generally cylindrical mounting tube;
a front wheel assembly including a rearwardly presented, generally cylindrical mounting tube;
a motor housing having a pair of generally cylindrical openings formed therein generally about a common longitudinal axis, said openings being sized for respective reception of said mounting tubes of said rear and front wheel assemblies, said motor housing being rotatable about said common axis with respect to said wheel assemblies;
a motor supported by said housing;
a cutting blade carried by said motor for relatively high speed rotation within a generally longitudinal plane, said cutting blade being movable to a selected one of a plurality of cutting positions in accordance with the rotational position of said housing;
first locking means movable between first and second positions respectively preventing and permitting rotational movement of said housing with respect to said rear wheel assembly;
second locking means movable between first and second positions respectively preventing and permitting rotational movement of said housing with respect to said front wheel assembly, and
a single actuator member movably mounted on said housing an carrying said first and second locking means for substantially simultaneously moving said first and second locking means between their first and second positions.

23. An edger as set forth in claim 22 wherein each of said rear and front wheel assemblies has a plurality of locking recesses formed therein, and wherein said first and second locking means each comprises a spring-biased lug carried by said housing for normal engagement into an associated one of said locking recesses.

24. An edger as set forth in claim 23 wherein each of said mounting tubes includes a radially enlarged thrust collar engageable with a portion of said housing to prevent substantial axial movement of said wheel assemblies with respect to said housing, and wherein said plurality of locking recesses on each of said wheel assemblies are formed about at least a portion of the arcuate peripheries of said thrust collars.

25. An edger as set forth in claim 23 wherein said actuator member comprises a longitudinally extending actuator bar carried within a chamber formed in said housing, said lugs being carried by said actuator bar in generally axial alignment respectively with said thrust collars.

26. An edger as set forth in claim 22 wherein said housing comprises a pair of generally complementary-shaped housing halves, and means for connecting said halves together to define said cylindrical openings.

27. An edger as set forth in claim 22 wherein said front wheel assembly includes at least one front wheel, and including means for adjusting the vertical height of said front wheel.

28. An edger, comprising:
a rear wheel assembly including a forwardly presented, generally cylindrical mounting tube having a plurality of locking recesses formed about at least a portion of the periphery thereof;
a front wheel assembly including a rearwardly presented, generally cylindrical mounting tube having a plurality of locking recesses formed about at least a portion of the periphery thereof;
a housing having a pair of generally cylindrical openings formed therein generally about a common longitudinal axis, said openings being sized for respective reception of said mounting tubes of said rear and front wheel assemblies, said motor housing being rotatable about said common axis with respect to said wheel assembly,
a motor supported by said housing;
a cutting blade carried by said motor for relatively high speed rotation within a generally longitudinal plane, said cutting blade being movable to a selected one of a plurality of cutting positions in accordance with the rotational position of said housing, and
locking means carried by said housing for movement between a first position preventing rotational movement of said housing with respect to said wheel assemblies and a second position permitting rotational movement of said housing with respect to said wheel assemblies, said locking means including an actuator bar carried within a longitudinal chamber formed in said housing for movement generally toward and away from said common axis, a pair of lugs carried at the opposite ends of said actuator bar for respective reception into associated ones of said locking recesses of said mounting tubes, and spring means for urging said lugs toward a normal position lockingly received into said recesses.

29. An edger as set forth in claim 28 wherein said housing has a slot formed therein partially exposing said actuator bar to permit manual grasping of said bar and movement thereof in a direction generally away from said common axis to retract said lugs from said associated locking recesses.

30. An edger as set forth in claim 28 wherein said actuator bar is formed integrally with said lugs and said spring means.

31. An edger as set forth in claim 28 wherein each of said mounting tubes includes a radially enlarged thrust collar engageable with a portion of said housing to prevent substantial axial movement of said wheel assemblies with respect to said housing, and wherein said plurality of locking recesses on each of said wheel assemblies are formed about at least a portion of the arcuate peripheries of said thrust collars.

32. An edger as set forth in claim 28 wherein said front wheel assembly comprises a pair of sections cooperating to define said rearwardly presented mounting tube, said sections further defining a generally forwardly presented vertical slot, a pivot arm having an upper end received into said slot and a lower end carrying at least one front wheel, means for constraining said pivot arm upper end within said slot for rotation with respect to said sections about a transverse axis, a locking member interposed between said pivot arm upper end and one of said sections, and a spring for urging said locking member into engagement with one axial face of said pivot arm upper end for preventing rotation of said pivot arm about said transverse axis, said locking member being at least partially exposed through an access opening in one of said sections to permit manual retraction of said locking member from said pivot arm and thereby permit pivoting movement of said pivot arm about said transverse axis.

33. An edger as set forth in claim 32 wherein said locking member includes a button projecting through said pivot arm upper end and at least partially through said access opening, said access opening being formed in the one of said sections on the transverse side of said pivot arm opposite said spring.

34. An edger as set forth in claim 32 wherein said locking member and said upper end of said pivot arm have generally complementary-shaped interengageable serrated locking surfaces.

* * * * *